Patented Aug. 23, 1938

2,127,952

UNITED STATES PATENT OFFICE 2,127,952

PROCESS OF MAKING REACTED PLASTER

Parker C. Choate, Essex, Mass.

No Drawing. Application October 21, 1935,
Serial No. 46,047

14 Claims. (Cl. 106—34)

This invention relates to new and useful methods of treating caustic lime and gypsum, to form hydrate and calcined gypsum mixtures, through exchange of the water of crystallization.

Lime hydrate is now made by contacting $H_2O$ with $CaO$, forming $CaO_2H_2$ in a very exothermic reaction with varying degrees of product quality.

Gypsum rock is calcined by heating kettles containing fine crushed $CaSO_4,2H_2O$, and such heating is rather uneven, often exceeding a critical temperature of 149° C. and decomposing $CaSO_4,\frac{1}{2}H_2O$, forming the unstable desiccating product $CaSO_4$. This is known as "second settle" or soluble anhydrite.

Gypsum rock is also calcined by direct heat in rotating kilns.

The processes are quite endothermic.

The lime and gypsum processes reverse each other in the disposition of $H_2O$, also in heat generation and consumption.

Building plaster is now formed by mechanical mixtures of the above products, to which water is added to form a putty for application to a wall surface, the plaster of Paris, which calcined gypsum is called, being regulated in time of set by mixing in, filming colloidal matter, called retarders.

My process utilizes the exothermic heat of lime hydration, to supply the endothermic heat of gypsum calcination, yielding a heat balance quite adequate to enable self reaction, when $CaO$ and $CaSO_4,2H_2O$ are properly admixed.

This is accomplished by the exchange of $H_2O$ after initiation of a reaction and mass temperature adequate to liberate $H_2O$ from the gypsum to attack caustic in admixture.

The mixed caustic and hydrous salt must be slowly tumbled to prevent local uneven heating reactions, and enable the reaction to complete itself and yield a useful plaster.

I find a rotating drum, with tumblers to break up friable lumps and enable active surfaces, very useful as conserving and equalizing mass temperature and enabling very complete hydration and decomposition.

Crushing members are not essential but desirable, as any form of tumbling on hearths of any shape or design with plows or means to promote looseness and aeration to enable adequate temperature and homogeneous exchange of $H_2O$, may be used.

To avoid confusion I define caustic as any $CaO$ or active $MgO$ product. Caustics are extremely variable in degree of chemical activity, due to differences in purity, films, or the temperature of burning, and known as quick lime.

Admixtures of $MgO$ are commonly inert, as overburned, but may be active, while small admixtures like borax or active silica, act as retarding films, or affect the quality of the hydrate set. The apparatus decided upon in use, the temperatures best utilized, and quality of product, etc., are materially dependent upon the quality of lime used in admixture, here called caustic to include all.

Gypsums vary some in chemical activity, as gypsite may carry organic matter and water in excess of that of the usual chemical formula $CaSO_4,2H_2O$. Gypsum as here involved may carry varied catalysts (supposed) which affect the nature of the calcined products here involved.

I find catalysts, or agents to modify the calcined product of gypsum, may be added to this mix in very small quantity such as 1% or less of the alums or hygroscopic salts.

I define soluble anhydrite as $CaSO_4$, the gypsum calcine formed above 149° C., having desiccating, unstable storage, with avid water absorbing characteristics.

I define slowly soluble anhydrite as $CaSO_4$ with no desiccating property, stable in storage and slowly soluble in water, thus yielding a time set of hours as compared to minutes, where soluble anhydrite is involved.

Slowly soluble anhydrite is formed by time and temperature of calcination of gypsum above 149° C., and is a new discovery, allotropic with soluble anhydrite, and one of the products in admixture involved in this specification.

Its cause of formation is unknown, but is believed to be due to catalysts existing in gypsums calcined.

Insoluble anhydrite is here defined as the well known product called dead burned gypsum, the product of over heating, practically inert, with infinite time of set when mixed with water.

It is believed that Keen's cement is made by activating insoluble anhydrite through admixed catalysts, as alums, and such cement holds similarity to the slowly soluble anhydrite here specified, yet each is formed by different process means.

I define reacted plaster as the product of reacting caustic and gypsum under controlled temperatures of exothermic self generation, with complete reaction and homogeneity, secured by means of tumbling during reaction.

Physically my process forms, as desired, mixtures of lime hydrate and plaster of Paris, or mixtures of lime hydrate and slowly soluble anhydrite.

Chemically my process reacts caustic and gypsum, the act being varied in temperature, time, mixtures and treatment to conform to the products desired and the quality of raw material used.

I claim added plasticity, softness, etc., because of the even exchange of $H_2O$ in the use of gypsum to supply $H_2O$; greater tensile strength because of milling, tumbling, rubbing action, as in a ball mill; homogeneity or complete reaction, because of tumbling and crushing at controlled mass temperature during reaction; the finished product as the result of one act, being a superior dry building plaster, entirely novel, where carrying slowly soluble anhydrite.

What is known as an anhydrite set is accepted as superior to the usual hemihydrate set, as being denser, using less water in hardening.

The slowly soluble anhydrite of this specification is thus superior in admixture with reacted lime hydrate, to the hemihydrate in such admixture.

Reactions between mixtures of caustic and gypsum have been described by prior inventors, and the academic reaction is old, but no descriptions have been made that are commercially operative, or enable the reaction to be carried to homogeneous completion, because no means of efficient exchange of $H_2O$ was shown or contemplated.

The act of grinding is old to enable plasticity, etc., while tumbling, to mix or to enable coatings or kindred purposes, is old.

Due to the individual and combined relations that the reaction of $CaO$ and $CaSO_4,2H_2O$ exhibit, and the necessity to prevent mass fusion by controlling regularity in $H_2O$ exchange, also to regulate the full quantity of $H_2O$ in absorption by $CaO$, the act of tumbling, involving no extraneous heating, appears essential with novelty, as enabling useful manufacture.

My discovery consists in the application of the act of tumbling involving aeration during reaction of caustic and gypsum in proportioned admixture with regulation of time and temperature to enable the form of mixed plaster desired.

To describe my operations I will present formulas to illustrate academic proportions.

1.
$$4CaO + 2H_2O + CaSO_4,2H_2O = 4CaO_2H_2 + CaSO_4$$
52% – 8% –    40%   =   69%  – 31%

This formula produces 31% of slowly soluble anhydrate in admixture, providing CaO in excess with adequate $H_2O$ to initiate reaction and hydrate CaO present.

The temperature of this reaction will run up to about 225° C. in a rotator mill and the formula approaches a low limit for reacted plaster in $CaSO_4$ content.

2.   $2CaO + CaSO_4,2H_2O = 2CaO_2H_2 + CaSO_4$
40%  –   60%   =   52%  – 48%

This is the academic reaction to form anhydrite, soluble or slowly soluble, shows no excess CaO and $H_2O$ desirable to enable initiation of reaction temperature, and dilute the per cent of anhydrite in the product, which latter usually should not exceed 40%.

This reaction, with reasonably active CaO, will create mass temperature up to 200° C., approximately.

3.
$$1\tfrac{1}{2}CaO + CaSO_4,2H_2O = 1\tfrac{1}{2}CaO_2H_2 + CaSO_4.\tfrac{1}{2}H_2O$$
84   –   172   =   111   –   145
33% –   67%  =   43%  –   57%

This reaction will form hemihydrate as a final result, but will give a mass temperature over 180° C., thus forming much soluble anhydrite, liberating excess $H_2O$, and water must be added during reacted mass cooling, to hydrate the desiccating $CaSO_4$ to form the stable $CaSO_4,\tfrac{1}{2}H_2O$.

The reaction of formula #3 is best conducted in a mill with free opening to allow escape of $H_2O$ liberated above 149° C., such as an open hearth or pan with ploughs.

No water or CaO is shown for initiating reaction, and lime hydrate may be added to the product to reduce the per cent of admixed hemihydrate.

All practical operative reacting mass temperature should be no lower than about 180° C. and no higher than about 225° C. to enable full decomposition of the $CaSO_4,2H_2O$ in the mix, and prevent excess temperature causing formation of insoluble anhydrite, or decomposing $CaO_2H_2$ already formed.

It is however specified that the definite limitation of operating temperatures, will be very much dependent upon the activity and character of the raw material used.

Formulas #1 and #2 with modifications to meet trade desires, appear as the more desirable, as liberating no free $H_2O$ above 149° C., and providing a better proportioned reacted mixed product.

Formula #3 can be used where tumbling conditions exist to enable disposition of the excess $H_2O$ necessarily liberated above 149° C.

Where formulas #1 and #2 are employed, the formation of a slowly soluble anhydrite will take place where adaptable gypsums are used, and adequate temperature and time (usually 200° C. and one to two hours reaction period) is permitted, any soluble anhydrite at first formed being changed to an allotropic form defined as non-desiccating—slowly soluble.

Should the gypsum not be amenable to the formation of slowly soluble anhydrite, or the desires of the operator prefer the formation of the soluble anhydrite, this will be the issue by reason of the character of the gypsum used or temperature and time of the tumbling reaction.

As soluble anhydrite is an unstable and non-commercial product, if present, it may be converted to hemihydrate $CaSO_4,\tfrac{1}{2}H_2O$ by adding water vapor to the mill during reacted mass cooling, as below 149° C. soluble anhydrite will absorb $H_2O$ vapor as a desiccant, while $CaSO_4,\tfrac{1}{2}H_2O$ is immune above 100° C. Care must be taken to avoid mass temperature dropping to below 100° C., where fluid $H_2O$ can exist, and the $CaSO_4,\tfrac{1}{2}H_2O$ changed to $CaSO_4,2H_2O$ by fluid $H_2O$ contact. $CaSO_4,2H_2O$ is destructive to the value of the mixed plaster, as producing nuclei seeding, creating quick setting properties.

Formula #3 is undesirable to form slowly soluble anhydrite, also undesirable as liberating excess $H_2O$ and forming a mixed plaster abnormally high in calcined gypsum content.

$H_2O$ should be added to the product of #3 formula to form a stable plaster, carrying $$CaSO_4,\tfrac{1}{2}H_2O$$

It is admitted that if #3 formula is milled and tumbled adequately at temperature, the product may be slowly soluble anhydrite as admixed, the excess $H_2O$ vapor having been dissipated, the condition of conversion of the soluble anhydrite to the slowly soluble anhydrite state having been found as a secondary act of operation; such act may require extraneous heat application, due to mass radiation loss.

To illustrate my process act, I describe operative apparatus, which however can be very variable in form.

I find suitable a horizontal rotating drum, best with tumblers, as loose balls, such drum built in a substantial manner, best with hollow shafts or trunnions, and with suitable gasket opening in the periphery, and connected to suitable means for rotating.

Into such an apparatus the proposed mixture is fed in various ways, through the hollow shaft, previously mixed or separately to be mixed in rotation, or fed in a mass through gasket openings. My process does not involve apparatus nor means of charging or discharging the product treated. The process described is known as the batch method, but I do not deny that it can be modified to conform to a continuous reaction process.

I next describe the necessary act of initiation of temperature of reaction.

Gypsum requires a temperature of about 80° C. to decompose and liberate $H_2O$, and if a substance like CaO—a caustic—is near or in admixture, the freed $H_2O$ will attack CaO forming $CaO_2H_2$, a fixed product under any temperature here used. Thus a little heat locally applied to the mass will start $H_2O$ liberation which will attack CaO generating much heat, which involves mass reaction propagation.

Very varied means may be used to start or initiate mass reaction by the propagation of local reaction. Applying local heat to the mass, or heating a portion previously charged, or heating the vessel, or a contacted electric resistor, are mentioned.

As a mixture of $H_2O$ and CaO initiates a reaction at atmospheric temperature, and this heat will enable or cause temperature propagation adequate to cause reaction in the mass in exothermic relation, the formulas #1, #2 and #3 either contain water or indicate its use in the charge, and thus provide a convenient means of starting or initiating a reaction which is self sustaining.

It is obvious that $H_2O$ cannot exist in a mixture containing CaO for any time previous to charging into a mill for reaction, so that all expressed formulas represent the mixed charge as in the reactor, and to be fed and admixed as desirable to initiate reaction and control rate and temperature of such reaction.

To describe a convenient practical way of conducting reaction to form slowly soluble anhydrite in admixture with $CaO_2H_2$, I describe:

Charge a portion of CaO and water into a rotator mill with crushing members desirable. Next feed in the whole or balance of the mix shown in formulas #1 and #2 in such manner and degrees as to enable mass temperature by propagation. When the mass has assumed a temperature condition by reaction propagation to enable continued temperature reaction (usually minutes) the mass (perhaps many tons) is slowly rotated, while the mass temperature will rise (usually within a half hour or so) to a temperature between 180° C. and 225° C. in accordance with the activity of materials used and method of feeding the portions of the designed mix.

Tumbling should continue at a moderate rate, (in large drums five turns per minute is adequate) until the mass reaction temperature indicates a maximum, and as much longer during cooling action as operators desire.

If no soluble anhydrite exists in the product, the slowly soluble anhydrite having been formed, the product is discharged, and may be ready to pack and use as a finished plaster, or may be further treated to meet trade conditions.

Little or no retarder, as organic colloids, need be used with properly prepared slowly soluble anhydrite reacted plaster, but admixed retarders may be used.

If soluble anhydrite exists, or any free CaO, as the issue of reaction, adequate water or its vapor should be introduced into the mill, at about the mass temperature of 149° C., but not continued below 100° C., where there is danger of forming condensed water to react with $CaSO_4,\frac{1}{2}H_2O$ and form $CaSO_4,2H_2O$, which latter is so very undesirable.

If formula #3 is utilized, liberating $H_2O$ above 149° C., the use of a semiclosed mill, preventing free escape of $H_2O$ vapor, is undesirable, but in any mill used a temperature of about 180° C. is necessary to complete decomposition of $CaSO_4$, $2H_2O$, and soluble anhydrite in part is the usual issue of reaction. The admixture of water, as above described is thus necessary to be added under the previous restrictions, to hydrate CaO, also $CaSO_4$ to $CaSO_4,\frac{1}{2}H_2O$.

The chemical reaction process decomposes large pieces of caustic, in the tumbling act, but less easily gypsum, while the presence of crushing members aid in breaking up friable pieces and maintaining fresh surfaces in reaction.

I find I can charge pieces of caustic of two inches or more in cross section, and a hammer milled product of gypsum of up to one-half inch cross section is suitable.

Fine mesh material is suitable, but more active in reaction.

Empirical trials appear as the only means of establishing the best means of feeding, initiating and controlling the reaction temperature, or knowing just what form of calcined gypsum will result. Chemical analysis will aid, but will not determine degrees of activity or catalysts, supposed to affect gypsum calcines, while the conditions of sizing, activity, radiation of apparatus in a given time, are so variable as to dictate that process acts be established for known product and apparatus.

Properly made the reacted plaster is the best so far known, and I have described essential conditions, and suggested practical operations, involving the formation of a novel useful time setting anhydrite formed in a new method of manufacture.

The new product claimed is non-desiccating, thus carries storage or stable properties not existing in soluble anhydrite or hemihydrate plaster mixes. Practically no colloidal retarder is needed, which in itself is unstable and very limited in protection of the $CaSO_4$, $\frac{1}{2}H_2O$ molecule against undesirable quick setting action when the plaster is applied as a flowing putty.

This self contained characteristic of the molecule $CaSO_4$, formed in the process act, alone is adequate to define and establish a new product as claimed, while such plaster product cannot be formed by other methods of reaction known, not become a useful plaster, except by tumbling at regulated temperature and for adequate time.

I do not specify apparatus, form, temperature degrees, or proportions of mix or product, confining my description to the means and purpose, with limitations existing to obtain proper plaster products.

What I claim as new and desire to protect by Letters Patent of the United States, is expressed in the following claims.

1. The process of forming an economic reacted plaster, which consists in tumbling a mixture of CaO and gypsum during the propagation of an inter reaction.

2. The process of producing reacted plaster, which consists in initiating a reaction in a mixture of caustic lime and gypsum to liberate $H_2O$ in the gypsum, then, during propagated reaction tumbling the mass by any means to aerate and to produce a uniform temperature throughout the mass in reaction, with homogenity of product.

3. In the process as shown in claim 2, the continuance of aerating tumbling, after a maximum mass temperature has been attained, with the addition of extraneously applied heat, to maintain mass temperature for a time period adequate to form the allotropic non-desiccating anhydrite from the desiccating, as first formed.

4. The process of making reacted plaster carrying admixed lime hydrate and "non-desiccating", "slowly soluble" anhydrite, which consists in the act of initiating a reaction in a proportioned mass mixture of caustic lime and gypsum, allowing propagation to raise the mass temperature above 180° C., and tumbling the mass during propagation, and for a time adequate to enable the desiccating anhydrite to change to the "non-desiccating" variety.

5. In the process of making reacted plaster, adding a small amount of $H_2O$ to a mass mixture of caustic lime and gypsum to initiate a local reaction therein by hydrating a portion of the caustic lime, and simultaneously tumbling said mixture to enable an efficient propagation of the reaction throughout the mass mixture.

6. The process of making reacted plaster comprising, initiating a local reaction in a mass mixture of caustic lime and gypsum on a hearth and then tumbling said mixture by means of ploughs during the mass temperature propagation period to enable aeration and efficient liberation and exchange of $H_2O$ to form lime hydrate and calcined gypsum in admixture.

7. In the process of making reacted plaster, the act of initiating reaction by locally heating a portion of a mixed mass of caustic lime and gypsum, thereby liberating $H_2O$ from the gypsum therein, said liberated $H_2O$ attacking the caustic lime, and through generated heat of reaction causing reaction propagation through the mass, and simultaneously tumbling said mixture to enable an efficient propagation of the reaction through the mass mixture.

8. In the process of making reacted plaster, the act which consists in tumbling mixtures of caustic lime and gypsum at reaction temperatures above 149° C., for a period of time adequate to decompose approximately all gypsum present, then adding $H_2O$ to the mass while cooling, to hydrate the "soluble anhydrite" to "hemihydrate".

9. In the propagating stage of reaction, after reaction initiation, in a mixture of caustic lime and gypsum, the act of tumbling in rotary mills, with adequate grinders, to break up lumps, or friable pieces, to enable physical and chemical mixture in the product.

10. The process of making reacted plaster, comprising initiating reaction in a mass mixture of caustic lime and gypsum propagating a reaction temperature above 149° C. and during such propagating reaction, tumbling the mixture to aerate the same.

11. The process of making reacted plaster from mixtures of caustic lime and gypsum, where the $H_2O$ of combination with the gypsum is more than adequate to hydrate all the CaO present, which consists in initiating a reaction in a part of the mixture, tumbling, with aeration, the mass during the propagating exothermic reaction, forming lime hydrate and calcined gypsum and continuing the tumbling action while cooling, to calcine approximately all the excess gypsum, by utilizing the specific mass heat.

12. The process of making reacted plaster, carrying lime hydrate and hemihydrate, as admixed calcine of gypsum, which consists in the step of initiating a local reaction in a mixture of caustic lime and gypsum, followed by the step of tumbling such mass during reaction propagation, with the mass temperature exceeding 149° C., followed by the final step of adding adequate $H_2O$ to hydrate desiccating $CaSO_4$ to $CaSO_4$, $\frac{1}{2}H_2O$, during continued tumbling.

13. The process of forming a homogeneous reacted plaster which consists in initiating a reaction in part of a mass mixture of caustic lime and gypsum, propagating the exothermic reaction between the CaO and $CaSO_4$, $2H_2O$ throughout the mass, tumbling the mass to aerate the propagating reacting mass, and continuing the tumbling during the decreasing mass temperature, after maximum reaction.

14. In the process of digesting exothermically reactive mixtures of caustic lime and gypsum to enable complete reaction, with uniformity of product, the act of tumbling such mass with aeration, during the reaction, and during the cooling period ensuing.

PARKER C. CHOATE.